May 17, 1960     J. PHILIPPI     2,936,639
RECIPROCATING DRIVE DEVICE

Filed Oct. 13, 1958     2 Sheets-Sheet 1

INVENTOR.
JOHN PHILIPPI
BY
Howard M. Herriot
ATTY.

May 17, 1960     J. PHILIPPI     2,936,639
RECIPROCATING DRIVE DEVICE
Filed Oct. 13, 1958     2 Sheets-Sheet 2
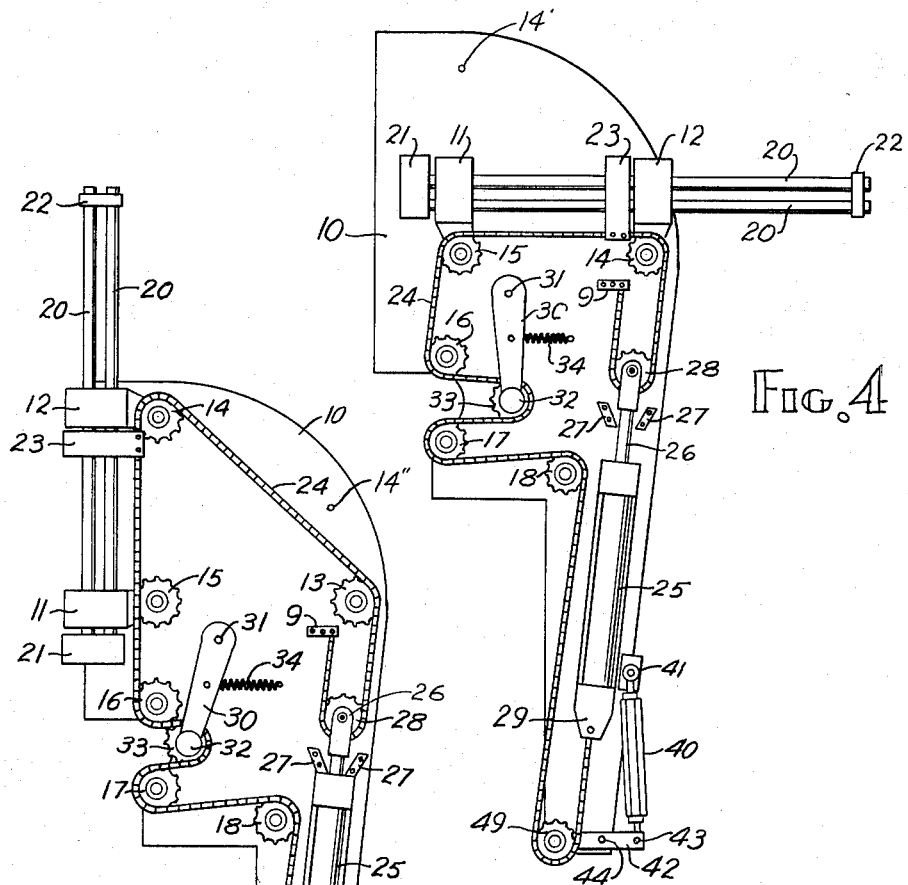
FIG. 4
FIG. 5
INVENTOR.
JOHN PHILIPPI
BY
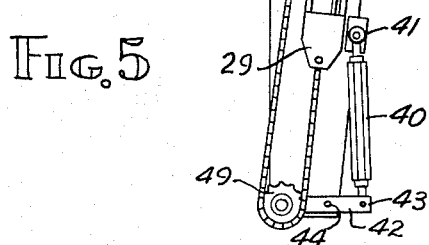
ATTY.

United States Patent Office 2,936,639
Patented May 17, 1960

2,936,639

RECIPROCATING DRIVE DEVICE

John Philippi, Janesville, Wis., assignor to The Parker Pen Company, Janesville, Wis., a corporation of Wisconsin Application October 13, 1958, Serial No. 766,989

7 Claims. (Cl. 74—222)

This invention relates to a reciprocating drive device and in particular to such a device having non-elastic linkage motion transmission means.

An object of this invention is to provide in a device of the character recited, overload protection in the event the linkage is jammed.

Another object of this invention is to provide a device having a driving member for reciprocating a driven member, wherein prevention of movement of the driven member does not cause a stoppage or interruption of movement of the driving member.

Yet another object is to provide a cam-actuated device for reciprocating a member, the device permitting one hundred percent overtravel of the cam relative to the member to be moved.

It is another object to provide in such a device, continuous tension on or tightening of the linkage.

A further object is to provide resilient means continuously tightening the linkage and also providing, together with a mechanical advantage mechanism, reciprocating motion of the linkage and overload protection in the event the linkage is jammed.

It is still another object to provide in such a device, a pulley system mechanical advantage mechanism combined with resilient means for providing such reciprocating motion, overload protection and tightening.

A still further object is to provide, in a device having such a pulley system mechanism, means for obtaining a variety of different straight-line direction paths for the reciprocating portion of the non-elastic flexible linkage.

It is an additional object to provide, in such a pulley system, fine adjustment means for opening or closing the loop formed by the linkage and the resilient means to thereby either compensate for improper linkage length or relocate the limits of the straight-line reciprocating path of the reciprocating portion of the linkage.

These and other objects and advantages will become apparent upon consideration of the following description when taken in conjunction with the appended drawings, in which:

Fig. 4 is a view, similar to Fig. 1, of the same device, but showing the tool-carrying portion of the chain linkage repositioned in a horizontal straight-line path, and further showing the lower portion or overload-protection portion of the chain linkage moved to provide overload protection during a jamming of the tool-carrying portion of the chain linkage;

Fig. 5 is a view similar to Fig. 1, of the same device, showing the tool-carrying portion of the chain linkage repositioned in a vertical straight-line path.

Figure 1:
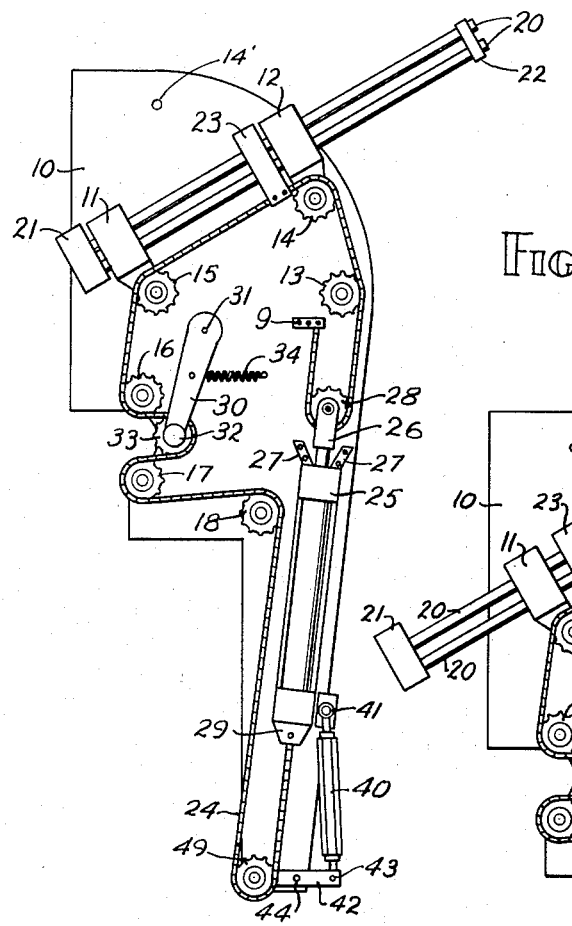
Fig. 1 is an elevational view of a chain linkage pulley system device embodying the invention and showing the chain linkage connected for carrying a tool along a slanted straight-line path for reciprocation therein.

Referring to the drawings, the invention is shown embodied in a reciprocating chain drive device for moving a tool head or tool 21 reciprocatingly in a straight-line path.

A mounting plate 10 supports the components of the device. A chain 24 has its first end fixed to an end mount 9 fixed on plate 10. The chain passes over a pulley system including pulley sprocket wheels 28, 13, 14, 15, 16, 33, 17, 18 and 49, and is connected at its other or second end to the lower terminal 29 of a movable air cylinder 25 of an air counterweight device. A movable piston rod 26 of the counterweight device has mounted thereon, at the upper end of the rod, the pulley wheel 28. The upper terminal of piston 26 and the lower terminal 29 of the cylinder are the upper and lower terminals, respectively, of an elastic or resilient coupling which connects the second end of the chain to the first portion of the chain adjacent the first end of the chain attached to end mount 9. The piston and the cylinder are referred to herein as the first and second terminals of the elastic or resilient coupling means.

A compressed air source (not shown), supplies air to the cylinder 25, urging the piston (not shown) and the piston rod 26 downwardly, and urging the cylinder 25 upwardly against a cylinder stop means 27, 27 fixedly mounted on plate 10.

The tool head or tool 21 is mounted on one end (the forward end) of a pair of slide rods 20, 20. The slide rods are connected to the chain by connector member 23 which is attached to the intermediate portion of rods 20, 20. A rear block 22 connects rods 20, 20 at the rear end thereof. The slide rods 20, 20 slide through guide blocks 11, 12 in a straight-line travel path, as the chain and the connector 23 are moved, as is explained hereinafter.

The pulley sprocket wheel 33 is mounted on a swingable cam arm 30 which is pivotably mounted at its upper end on plate 10 at pivot 31. A cam follower 32 on the lower end of arm 30 engages a drive cam 35 on a drive shaft 36, and thus upon rotation of the drive shaft there is applied to cam arm 30 a reciprocable swinging motion for driving the chain linkage.

The air cylinder 25, and the piston rod 26, are continuously urged, by the compressed air, in opposite directions, as above set forth, thereby urging the ends of the chain closer together to tighten the chain and maintain it taut. This tightening action also urges cam follower 32 against drive cam 35. A cam arm spring 34 of desired tension may be provided to act on cam arm 30, so that, in the event the cam does not at all times bear against the cam follower, the spring will resiliently urge the cam follower arm to maintain tension in the drive chain, holding the drive chain in proper engagement with all the pulley sprocket wheels in the system.

Pulley wheels 28 and 33 are each movable relative to plate 10 whereas the other pulleys 13, 14, 15, 16, 17, 18 and 49, although repositionable on the plate, are fixed in position thereon, except, of course, for rotating about their axes.

Figure 2:
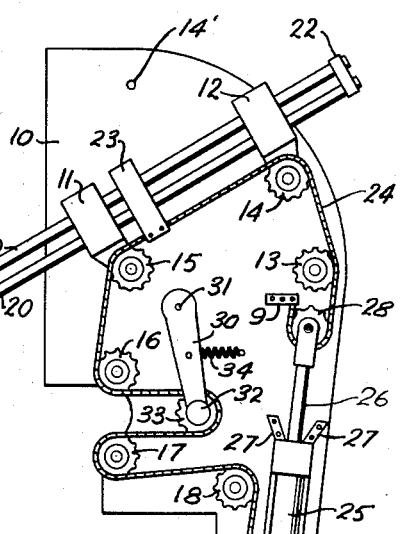
Fig. 2 is a similar view of the device showing the tool and the upper or tool-carrying portion of the chain linkage driven to a different position along the straight-line path.
Figure 3:
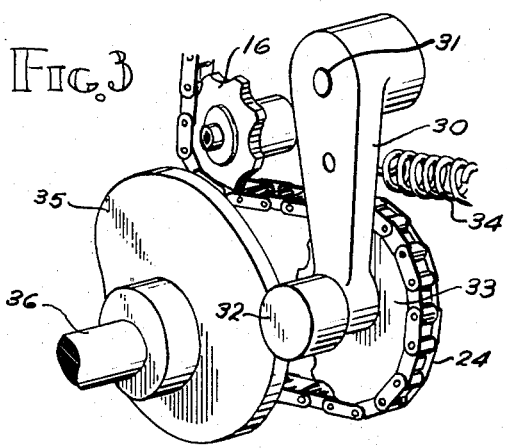
Fig. 3 is a perspective view illustrating the drive portion of the device and a drive means for the device.

Referring to Figs. 1 and 2, the operation of the device is as follows. As the cam arm 30 is driven by the drive cam 35, swinging the cam arm inwardly (to the right), the pulley 33 applies to the chain 24 a force pulling on each end of the chain and moving cylinder 25 and rod 26 further apart, thus moving the ends of the chain further apart.

Movable pulley 28, being disposed so that two strands of the pulley system chain pull on the piston rod 26, as contrasted to the one strand of the chain pulling on cylinder 25, provides a mechanical advantage to the pulling force acting on the piston rod, so that piston rod 26 is urged upwardly with a force twice as great as the force urging cylinder 25 downwardly. As show in Fig. 2, the rod 26 is thereby moved upwardly, and cylinder 25 remains stationary in contact with the stop means 27, 27.

The portion of the chain between drive pulley wheel 33 and end mount 9, herein referred to as the first or upper portion, is therefore moved as is shown by a comparison of Figs. 1 and 2. The other portion of the chain, i.e. the portion between drive pulley wheel 33 and the lower cylinder end 29, herein referred to as the second or lower portion of the chain, remains stationary. The movement of the first or upper portion of the chain moves as a unit, the tool connector 23, slide rods 20, 20, and tool 21; thereby driving the tool 21 along a straight-line path. The change in position due to this movement is clearly illustrated in comparing Fig. 1 with Fig. 2.

The device also provides one hundred percent overtravel of the drive cam relative to the tool or tool holder 21, in the event the latter should jam or be overloaded, or for any other reason the above described movement of the first or upper portion of the chain is prevented. This prevention of movement may also be caused intentionally, as by a deliberate blocking or "locking out" of the tool or tool holder from movement, for example, upon encountering a defective or missing workpiece when the device is installed for automatic operation on workpieces being indexed sequentially into position relative to the device. When this happens, the second or lower portion of the chain, pulling downwardly on cylinder 25, will move, and pull cylinder 25 downwardly away from stop means 27, 27. This provides overload or jamming protection, and this movement is illustrated in Fig. 4 wherein, during a jamming or blocking of tool 21, the swinging movement of the cam arm 30 to the right cannot move the upper portion of the chain, but can and does move the lower portion thereof to pull cylinder 25 downwardly away from cylinder stops 27, 27.

It will thus be appreciated that, under normal (non-jamming) conditions, as drive cam 35 swings cam arm 30 in and out, the first portion of the chain, carrying the tool, is reciprocated back and forth over a straight-line path; but if a jamming or blocking occurs, the second portion of the chain moves, against the resilient or elastic resistance of the air counterweight, to provide overtravel or overload protection to eliminate damage from jamming or overloading.

It will be understood that the invention need not utilize an air cylinder counterweight type of resilient means, but may employ any suitable means for continuously elastically or resiliently urging the chain ends together. Instead of the pneumatic means shown, other means such as hydraulic means or spring means may be utilized.

In Figs. 1 and 2, fixed pulleys 14 and 15 establish the slanted straight-line path for the movement of the tool. The straight-line path of movement for the tool 21, which path is disposed in a slanted angle in Figs. 1 and 2, may be selectively established to other desired angles, by repositioning, on plate 10, one or more of more of the fixed pulleys.

For example, in Fig. 4, pulley 13 has been removed from the plate 10, and pulley 14 has been repositioned from its position in Figs. 1 and 2 to its position in Fig. 4, establishing with pulley 15, a horizontal straight-line path for the tools.

And, in Fig. 5, pulley 14 has been repositioned from its position in Figs. 1 and 2 to its position in Fig. 5, establishing with pulley 15, a vertical straight-line path for the tool.

Any suitable means may be used to permit such repositioning, such as extra auxiliary mounting holes in plate 10, as for example, holes 14' and 14", and any suitable fastening means may be used to fix the pulley wheels in position on the plate.

The two pulley wheels 14 and 15, which establish the straight-line path for the tool, are preferably mounted on guide block structures 11 and 12 thereby permitting easy and simultaneous repositioning of these pulleys and guide blocks. These guide blocks and the pulley wheels 14 and 15 may also be carried on an auxiliary plate (not shown), which is attached to the mounting plate 10 as to permit an easy repositioning of the auxiliary plate, providing an easy means of repositioning the guide blocks and pulley wheels 14 and 15 as a unit to change the direction of reciprocation of the tool.

The chain length is of course changed to accommodate the repositionings and this may be done by adding or removing links from the chain, or by utilizing a different chain of the proper length for the repositioned arrangement.

It will be understood that the invention need not include a chain type of linkage, but any suitable non-elastic linkage may be used. For example, in a pulley system, any suitable non-elastic flexible member such as a belt, rope, or cable could be used.

Another feature of the invention is that pulley 49 is swingably repositionably mounted on plate 10. The pulley wheel 49 is mounted on a lever arm 42 which is pivotally mounted on the plate 10 at pivot 44. A turn buckle device 40 is mounted between a fixed point 41 on plate 10 and the end 43 of lever 42 for providing swingable adjustment to lever 42 to thereby position pulley 49. It is thus seen that an adjustment means is provided for repositioning pulley 49 to either take up or provide slack in the chain to thereby compensate for a chain which is not of quite the proper length. This provides a fine adjustment; much finer than removing or adding a link to the chain. The turnbuckle adjusting means also permits either letting in or pulling out of piston rod 26 to thereby position connector 23 in the desired position for providing the desired starting point for the stroke of tool 21. This provides a fine adjustment; much finer than the link by link adjustment of moving connector 23 to a link by link new position on chain 24.

Although but one embodiment of the invention has been shown and described, it will be apparent to those skilled in the art that various modifications and changes may be made therein without departing from the spirit of the invention or the scope of the appended claims.

I claim:

1. A reciprocating drive device comprising: a substantially non-elastic linkage having first and second ends and first and second portions joined at a place intermediate said ends, said first end being fixed and said second end being spaced from and movable relative to said first end; elastic means connecting said first portion to said second end, said elastic means having a first terminal connected to said first portion and a second terminal connected to said second end; drive means for applying to and removing from said linkage at said place a force acting on each of said terminals urging said terminals in opposite directions, said elastic means continuously elastically urging said terminals in directions opposite to the directions urged by said force of said drive means; and force multiplying means providing a mechanical advantage to the action of said force on said first terminal; said device thereby (a) normally effecting reciprocation of said first portion and maintaining said second portion stationary, and (b) under circumstances preventing movement of said first portion, effecting reciprocation of said second portion to thus provide overload or jamming protection.

2. A reciprocating drive device comprising: a substantially non-elastic flexible member having first and second ends and first and second portions joined at a place intermediate said ends, said first end being fixed and said second end being spaced from and movable relative to said first end; elastic means connecting said first portion to said second end, said elastic means having a first terminal connected to said first portion and a second terminal connected to said second end; drive means for applying to and removing from said member at said place a force pulling on each of said terminals urging said terminals apart, said elastic means continuously elastically urging said terminals together; and force multiplying means providing a mechanical advantage to the pull acting on said first terminal; said device thereby (a) normally effecting reciprocation of said first portion and maintaining said second portion stationary, and (b) under circumstances preventing movement of said first portion, effecting reciprocation of said second portion to thus provide overload or jamming protection.

3. A reciprocating drive device comprising: a non-elastic flexible member having first and second ends, and first and second portions joined at a place intermediate said ends, said first end being fixed and said second end being spaced from and movable relative to said first end; elastic means connecting said first portion to said second end, said elastic means having a first terminal connected to said first portion and a second terminal connected to said second end; drive means for applying to and removing from said member at said place a force pulling on each of said terminals urging said terminals apart, said elastic means continuously elastically urging said terminals together; and a movable pulley mounted on said first terminal and disposed between said first end and said place for receiving said first portion thereover to provide a mechanical advantage to the pull acting on said first terminal; said device thereby (a) normally effecting reciprocation of said first portion and maintaining said second portion stationary, and (b) under circumstances preventing movement of said first portion, effecting reciprocation of said second portion to thus provide overload or jamming protection.

4. A reciprocating drive device comprising: a non-elastic flexible member having first and second ends and first and second portions joined at a place intermediate said ends, said first end being fixed and said second end being spaced from and movable relative to said first end; elastic means connecting said first portion to said second end, said elastic means having a first terminal connected to said first portion and a second terminal connected to said second end; drive means for applying to and removing from said member at said place a force pulling on each of said terminals urging said terminals apart; fixed stop means for said second terminal; said elastic means continuously elastically urging said terminals together maintaining said member taut and urging said second terminal against said stop means; and a movable pulley mounted on said first terminal and disposed between said first end and said place for receiving said first portion thereover to provide a mechanical advantage to the pull acting on said first terminal; said device thereby (a) normally effecting reciprocation of said first portion and maintaining said second portion stationary, and (b) under circumstances preventing movement of said first portion, effecting reciprocation of said second portion to thus provide overload or jamming protection.

5. A reciprocating tool device comprising: a non-elastic flexible member having first and second ends and first and second portions joined at a place intermediate said ends, said first end being fixed and said second end being spaced from and movable relative to said first end; elastic means connecting said first portion to said second end, said elastic means having a first terminal connected to said first portion and a second terminal connected to said second end; drive means for applying to and removing from said member at said place a force pulling on each of said terminals urging said terminals apart; fixed stop means for said second terminal; said elastic means continuously elastically urging said terminals together maintaining said member taut and urging said second terminal against said stop means; a movable pulley mounted on said first terminal and disposed between said first end and said place for receiving said first portion thereover to provide a mechanical advantage to the pull acting on said first terminal, and tool means fixed to said member on said first portion between said pulley and said drive means; said device thereby (a) normally effecting reciprocation of said first portion and maintaining said second portion stationary, and (b) under circumstances preventing movement of said first portion, effecting reciprocation of said second portion to thus provide overload or jamming protection.

6. A pulley system reciprocating tool drive device comprising: a non-elastic flexible member having first and second ends and first and second portions joined at a place intermediate said ends, said first end being fixed and said second end being spaced from and movable relative to said first end; elastic means connecting said first portion to said second end, said elastic means having a first terminal connected to said first portion and a second terminal connected to said second end; a plurality of fixed pulleys receiving thereover said member and defining a first straight-line path for a part of said first portion and defining a second straight-line path for the relative movement of said terminals; drive means for applying to and removing from said member at said place a force pulling on each of said terminals urging said terminals apart; fixed stop means for said second terminal; said elastic means continuously elastically urging said terminals together and urging said second terminal against said stop means; and a movable pulley mounted on said first terminal and receiving said first portion of said member thereover providing a mechanical advantage to the pull acting on said first terminal; said device thereby (a) normally effecting reciprocation of said first portion and maintaining said second portion stationary, and (b) under circumstances preventing movement of said first portion, effecting reciprocation of said second portion to thus provide overload or jamming protection.

7. The invention defined in claim 6 wherein one of said fixed pulleys is repositionable for changing the direction of said first straightline path.

References Cited in the file of this patent
UNITED STATES PATENTS

| | | |
|---|---|---|
| 411,082 | Wright | Sept. 17, 1889 |
| 497,706 | Chase | May 16, 1893 |